United States Patent [19]
Dukhovskoi et al.

[11] 4,361,596
[45] Nov. 30, 1982

[54] PROCESS FOR THE MANUFACTURE OF INDUSTRIAL RUBBER ARTICLES

[76] Inventors: Evgeny A. Dukhovskoi, prospekt Vernadskogo, 127, kv. 467; Alexandr M. Kleiman, naberezhnaya M. Gorkogo, 40/42, kv. 244, both of Moscow; Ardalion N. Ponomarev, Noginsky raion, p/o Chernogolovka, ulitsa Tretia, 2, kv. 3, Moskovskaya oblast; Askold A. Silin, prospekt Vernadskogo, 93, kv. 95, Moscow; Valentina M. Skok, prospekt Vernadskogo, 93, kv. 94, Moscow; Viktor L. Talroze, Vorobievskoe shosse, 11, kv. 21, Moscow; Anatoly V. Khomyakov, ulitsa Studencheskaya, 30, stroenie 2, kv. 2, Moscow, all of U.S.S.R.

[21] Appl. No.: 190,803

[22] Filed: Sep. 25, 1980

[30] Foreign Application Priority Data

Sep. 25, 1979 [SU] U.S.S.R. ............................ 2810499

[51] Int. Cl.$^3$ ............................................. B05D 3/14
[52] U.S. Cl. .................................... 427/41; 428/421
[58] Field of Search ................... 427/38, 39, 40, 41; 428/421

[56] References Cited
U.S. PATENT DOCUMENTS 3,475,307 10/1969 Knox et al. .......................... 427/41
3,632,400 1/1972 Burlant .............................. 428/421
3,853,600 12/1974 Hou .................................. 428/367
4,188,426 2/1980 Auerbach ............................ 427/40

Primary Examiner—John H. Newsome
Attorney, Agent, or Firm—Lilling & Greenspan

[57] ABSTRACT

A process for the manufacture of industrial rubber articles comprises vulcanization of a rubber mix, wherein prior to vulcanization the rubber mix is treated with a fluoroorganic compound and after vulcanization the articles are placed into a sealed chamber with the pressure therein below 10 Pa. An electric glow discharge is ignited in the chamber and the articles are treated therewith. The treatment with the electric glow discharge is stopped when a residual pressure in the chamber of below 100 Pa is reached. The process for the manufacture of industrial rubber articles according to the present invention makes it possible to produce articles with a coefficient of friction on their surface of from 0.2 to 0.6 depending on the type of rubber and enables an increase in productivity of machines and apparatus.

5 Claims, No Drawings

PROCESS FOR THE MANUFACTURE OF INDUSTRIAL RUBBER ARTICLES

FIELD OF THE INVENTION

The present invention relates to the production of coatings on industrial rubber articles and, more specifically, to processes for the manufacture of industrial rubber articles.

The present invention is useful in the rubber industry for the manufacture of industrial rubber goods having a coefficient of friction which is uniquely low for vulcanized rubber and an increased wear-resistance.

The industrial rubber articles manufactured according to the present invention can be used in mobile and stationary devices of a wide range for machines and apparatus, as well as in bearings and other friction units. The low friction and chemical inactivity of the working surface of these industrial rubber articles completely eliminates adherence of rubber to metals in air, vacuum and water.

In mechanical control systems the use of such industrial rubber articles makes it possible to substantially increase the reliability and sensitivity of such systems. The rubber goods made according to the present invention can be also useful in the medical industry.

Known in the art are processes for the manufacture of industrial rubber articles by way of vulcanizing rubber mix (cf. Tinyakova E. I. et al., in Coll. "Volcanization of Rubbers", Goskhimizdat Publishing House, 1953, p.33; F. F. Koshelev, A. E. Kornev, N. S. Klimov "General Processing of Rubber", "Khimija" Publishing House, Moscow, 1968, p.440–443).

These processes are based on the phenomenon that under the influence of high temperatures and pressures the rubber mix is polymerized to give the final industrial rubber article.

However, the level of antifriction properties of rubber articles produced by the prior art process is insufficient.

Among the above-mentioned processes the closest prior art process most resembling that of the present invention is the process for the manufacture of industrial rubber articles comprising vulcanization of a rubber mix (cf. F. F. Koshelev, A. E. Klimov, N. S. Klimov "General Processing of Rubber", Khimija Publishing House, Moscow, 1968, p.440–443).

This process does not make it possible to produce industrial rubber articles with a low friction coefficient.

SUMMARY OF THE INVENTION

It is an object of the present invention to provide a process for the manufacture of industrial rubber goods possessing a low friction coefficient of their surface.

This object is accomplished by a process for the manufacture of industrial rubber articles involving vulcanization of a rubber mix. According to the present invention, prior to vulcanization the rubber mix is treated with a fluoro-organic compound and after the vulcanization the articles shaped from the thus-treated rubber mix are placed into a sealed chamber, wherefrom air is evacuated to a residual pressure of below 10 Pa, an electric glow discharge is ignited in the chamber and the articles are treated therewith simultaneously. The vacuum adjustment in the chamber and the treatment of the articles with the electric glow discharge is discontinued upon achieving a residual pressure of below 100 Pa in the chamber.

It is advisable to treat the rubber mix with a fluoroorganic compound selected from the group consisting of perfluorinated liquid, an emulsion of polytetrafluoroethylene, an ester of acrylic acid and fluorinated alcohol, an ester of methacrylic acid and a fluorinated alcohol.

The present invention makes it possible to produce industrial rubber articles with a friction coefficient which is uniquely low for rubber vulcanizates, without changing formulations of the starting materials.

This considerably increases the efficiency of machines and apparatus, for example it extends the service life period of packing assemblies of automobile units.

DETAILED DESCRIPTION OF THE INVENTION

The process for the manufacture of industrial rubber goods involves vulcanization of a rubber mix in a mold. Prior to vulcanization the rubber mix is treated with fluoroorganic compounds by wetting the surface of the rubber mix with these compounds in the liquid state. During vulcanization of the rubber mix under the effect of high temperature and pressure there occurs a chemical combination of fluoroorganic compounds with the rubber mix. After vulcanization the resulting articles are placed into a sealed chamber, wherefrom air is evacuated to a pressure of below 10 Pa and then an electric glow discharge is ignited in the chamber and the articles are treated therewith simultaneously the adjusting vacuum in the chamber. Under the effect of the electric glow discharge there occurs cross-linking of fluoroorganic compounds contained in the superficial layer, whereby on the surface of industrial rubber articles there is formed a solid-lubricant coating chemically bonded with the base and possessing unique antifriction properties. The necessity for a preliminary evacuation of air from the chamber to a pressure of below 10 Pa is caused by the necessity for the removal of oxygen from the chamber which hinders the above-described process of cross-linking the fluoroorganic compounds on the surface of industrial rubber articles.

Upon ignition of an electric glow charge under dynamic vacuum, pressure in the chamber is first increased, which is associated with evolution of low-molecular fractions and various contaminants from the rubber and then pressure is gradually decreased. The treatment in the electric glow discharge is discontinued upon achieving a residual pressure in the chamber of below 100 Pa, i.e. when the process of descriptional deactivation of the rubber surface is completed as a result of the formation of the graft solid-lubricant coating thereon.

In the selection of fluoroorganic compounds for the treatment of the surface of a rubber mix, the preference is given to the compounds selected from the group consisting of a perfluorinated liquid, an emulsion of polytetrafluoroethylene, an ester of acrylic acid or methacrylic acid and a fluorinated alcohol.

The coefficient of friction of articles manufactured by the process according to the present invention ranges from 0.2 to 0.6.

For a better understanding some specific Examples are given hereinbelow by way of illustration.

EXAMPLE 1

Samples of industrial rubber articles are made by the process according to the present invention from a rubber mix based on butadiene-nitrile rubber.

A plate of a rubber mix is wetted with perfluorinated liquid, charged into a mold and vulcanized under the conditions chosen for the given kind of rubber. In this manner a flat sample is made with the dimensions of 150×150 mm and thickness of 3 mm.

Then the sample is placed into a sealed chamber of a laboratory glass unit, wherein there is created a vacuum of 1 Pa. The electric glow discharge is ignited in the chamber by means of applying voltage of 600 V with a frequency of 50 Hz to the electrodes positioned inside the chamber. Upon the formation of an electric discharge and continuous evacuation of air from the chamber, the pressure therein is first increased and then slowly reduced. Vacuum in the chamber is adjusted and the treatment with the electric glow discharge is stopped when the residual pressure reaches 10 Pa. The coefficient of friction of the articles is measured by means of a conventional tribometer. The friction coefficient is equal to 0.4.

EXAMPLE 2

Samples of industrial rubber articles are manufactured by the process of the present invention from a mix based on butadiene-nitrile rubber. A plate of the rubber mix is wetted with an emulsion of polytetrafluoroethylene, charged into a compression mold and vulcanized under the conditions chosen for the given kind of rubber. In this manner a 150×150 mm sample is produced having a thickness of 3 mm. The sample is placed into a sealed chamber of a laboratory glass unit, wherein vacuum of 1 Pa is created.

An electric glow discharge is ignited by applying voltage of 600 V and a frequency of 50 Hz to the electrodes disposed in the chamber. Upon the origination of the electric glow discharge and under continuous evacuation of air from the chamber, the pressure therein is first increased and then gradually reduced. The treatment with the electric glow discharge is stopped when a residual pressure of 50 Pa is reached. The friction coefficient is 0.5.

EXAMPLE 3

Rubber articles are manufactured from a mix based on butadiene-nitrile rubber by the process of the present invention. A plate from a rubber mix is wetted with an ester of acrylic acid and a fluorinated alcohol and charged into a compression mold where it is vulcanized under the conditions chosen for the given type of rubber. In this manner a 150×150 mm sample is produced having a thickness of 3 mm. Then the sample is placed into a sealed chamber of a glass laboratory unit, wherein vacuum of 5 Pa is created.

An electric glow discharge is ignited in the chamber by applying voltage of 600 V with a frequency of 50 Hz onto the electrodes positioned in the chamber. Upon the origination of the electric discharge and continuous evacuation of air from the chamber, pressure therein is first increased and then gradually reduced. The vacuum in the chamber is adjusted and the treatment of the articles with the electric glow discharge is stopped upon achieving a residual pressure of 50 Pa. The friction coefficient is 0.4.

The formula of the employed ester of acrylic acid and a fluorinated alcohol is as follows:

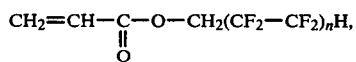

wherein n=1-4.

EXAMPLE 4

Samples of industrial rubber articles are produced from a mix based on butadiene-nitrile rubber by the process of the present invention. A plate of the rubber mix is wetted with an ester of acrylic acid and a fluorinated alcohol, charged into a mold and vulcanized under the conditions set for the given type of rubber. In this manner a 150×150 mm sample is produced having a thickness of 3 mm. Then the sample is placed into a sealed chamber of a laboratory glass unit, wherein a vacuum of 5 Pa is created.

An electric glow discharge is ignited by applying voltage of 600 V with a frequency of 50 Hz onto the electrodes positioned in the chamber. Upon the emergence of the electric discharge and continuous evacuation of air from the chamber the pressure therein is first increased and then gradually lowered. The treatment with the electric glow discharge is stopped when the residual pressure reaches 50 Pa. The friction coefficient is equal to 0.4. The employed ester of acrylic acid and fluorinated alcohol has the formula:

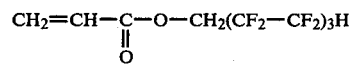

EXAMPLE 5

Industrial rubber goods are manufactured by the process of the present invention from a rubber mix based on butadiene-nitrile rubber. A plate of the rubber mix is wetted with an ester of acrylic acid and a fluorinated alcohol, charged into a compression mold and vulcanized under the conditions chosen for the given kind of rubber. In this manner a 150×150 mm sample is produced having a thickness of 3 mm. Then the sample is placed into a sealed chamber of a laboratory glass unit, wherein a vacuum of 5 Pa is created. An electric glow discharge is ignited in the chamber by applying a voltage of 600 V and frequency of 50 Hz onto the electrodes positioned in the chamber. Upon the origination of the electric discharge and continuous evacuation of air from the chamber, pressure therein is first increased and then gradually released. Vacuum in the chamber is controlled and the treatment of the article with the electric glow discharge is stopped when a residual pressure of 50 Pa is reached.

The friction coefficient is equal to 0.6.

The employed ester of acrylic acid and fluorinated alcohol has the following formula:

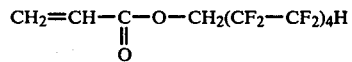

EXAMPLE 6

Samples of industrial rubber articles are produced by the process of the present invention from a rubber mix based on butadiene-nitrile rubber. A plate of the rubber mix is wetted with an ester of methacrylic acid and fluorinated alcohol, charged into a mold and vulcanized under the conditions chosen for the given kind of rubber. In this manner a 150×150 mm sample is produced having a thickness of 3 mm. Then the sample is placed into a sealed chamber of a laboratory glass unit, wherein a vacuum of 10 Pa is created. An electric glow discharge is ignited by applying a voltage of 600 V with a frequency of 50 Hz onto the electrodes disposed in the chamber. Upon the origination of the electric glow discharge and continuous evacuation of air from the chamber, the pressure therein is first increased and then slowly reduced. The glow-discharge treatment is stopped when the residual pressure of 100 Pa is reached. The friction coefficient is equal to 0.6.

EXAMPLE 7

Industrial rubber articles are manufactured by the process of the present invention from a rubber mix based on ethylene-propylene rubber.

A plate of the rubber mix is wetted with perfluorinated liquid, charged into a compression mold and vulcanized under the conditions chosen for the given kind of rubber. In this manner a 150×150 mm sample is produced having 3 mm thickness. Then the sample is placed into a sealed chamber of a glass laboratory unit, wherein a vacuum of 5 Pa is created. An electric glow discharge is ignited in the chamber by applying voltage of 600 V with a frequency of 50 Hz onto the electrodes positioned inside the chamber. Upon the origination of the electric discharge and continuous evacuation of air from the chamber, pressure therein is first increased and then gradually released. Vacuum in the chamber is controlled and the article's treatment with the electric glow discharge is discontinued when a residual pressure of 10 Pa is reached.

The friction coefficient is equal to 0.4.

EXAMPLE 8

Samples of industrial rubber goods are produced by the process of the present invention from a rubber mix based on fluorosiloxane rubber.

A plate of the rubber mix is wetted with perfluorinated liquid, placed into a compression mold and vulcanized under the conditions chosen for the given type of rubber. In this manner, a sample with the dimensions of 150×150×3 mm is made. Then the sample is placed into a sealed chamber of a glass laboratory unit, wherein a vacuum of 5 Pa is created. An electric glow discharge is ignited in the chamber by applying a voltage of 600 V with a frequency of 50 Hz onto the electrodes positioned inside the chamber. Upon the origination of the electric discharge and continuous evacuation of air from the chamber, the pressure therein is first increased and then gradually released. The treatment with the electric glow discharge is stopped upon achieving a residual pressure of 10 Pa in the chamber. The friction coefficient is equal to 0.5.

EXAMPLE 9

Industrial rubber articles are made from a rubber mix based on fluorine rubber by the process of the present invention. A plate of the rubber mix is wetted with perfluorinated liquid, placed into a compression mold and vulcanized under the conditions chosen for this particular kind of rubber. In this manner a sample with the size of 150×150×3 mm is manufactured. An electric glow discharge is ignited in the chamber by applying a voltage of 600 V with a frequency of 50 Hz onto the electrodes positioned in the chamber. Upon the origination of the electric glow discharge and continuous evacuation of air from the chamber, pressure therein is first increased and then gradually reduced. Vacuum in the chamber is controlled and the treatment of the article is stopped when a residual pressure of 10 Pa is reached.

The friction coefficient is equal to 0.2.

The use of the process for the manufacture of industrial rubber articles makes it possible to produce articles with a friction coefficient of their surface ranging from 0.2 to 0.6 depending on the kind of rubber.

What is claimed is:

1. A process for manufacturing industrial rubber articles having a reduced coefficient of friction comprising:

treating an unvulcanized rubber preform by contacting its surface with a fluoroorganic compound selected from the group consisting of perfluorinated liquid, an emulsion of polytetrafluoroethylene, an ester of acrylic acid and a fluorinated alcohol, or an ester of methyacrylic acid and a fluorinated alcohol;

molding and vulcanizing said treated rubber preform to form an article;

placing said treated vulcanized rubber article into a sealed chamber at a pressure below 10 Pa and exposing said article therein to an electric glow discharge;

controlling the pressure in said chamber with said electric glow discharge and discontinuing the electric glow discharge upon reaching a residual pressure of below 100 Pa.

2. The process of claim 1, wherein said fluoroorganic compound is an emulsion of polytetrafluoroethylene.

3. The process of claim 1, wherein said fluoroorganic compound is an ester of acrylic acid and a fluorinated alcohol.

4. The process of claim 1, wherein said fluoroorganic compound is an ester of methacrylic acid and a fluorinated alcohol.

5. A product formed by the process of any one of claims 1 to 3 or 4.

* * * * *